Patented Nov. 3, 1925.

1,559,906

UNITED STATES PATENT OFFICE.

EUGENE J. NAGY, OF NEW BRUNSWICK, NEW JERSEY.

METHOD OF PREPARING POULTRY FOR PACKING OR DISPLAY.

No Drawing. Application filed March 14, 1925. Serial No. 15,634.

*To all whom it may concern:*

Be it known that I, EUGENE J. NAGY, a citizen of the United States, residing at New Brunswick, in the county of Middlesex and State of New Jersey, have invented certain new and useful Improvements in Methods of Preparing Poultry for Packing or Display, of which the following is a specification.

This invention relates to an improved method of preparing poultry, such as chickens, turkeys, ducks, and the like, for packing or for sale on the market.

According to present practice it is customary to prepare poultry for sale by merely removing the feathers, and in some cases, the head and feet of the fowl. It has been found, however, that poultry prepared in this manner soon spoil, if left exposed for any considerable period, and furthermore are not in suitable condition for packing.

The principal object of the present invention is, therefore, to provide a method of preparing poultry for packing or for sale on the market in such a condition that they will not spoil even if left exposed for a considerable period of time.

I have found that the principal reason that poultry prepared in the usual manner, spoil in a short time, when packed or exposed for sale, is the presence in the intestines of the fowl of partially digested material, together with bacteria in large quantities. This material soon commences to decompose, and from thence the decomposition spreads to the edible parts of the fowl.

It is, of course, possible to remove the intestines by cutting out these parts. When this is done, however, the interior of the fowl is exposed to the air and it is found that in such cases also decomposition soon follows.

I have found, however, the intestines can be removed from the fowl without any cutting operation other than the severance of the withdrawn intestines, and when so prepared, poultry will keep for a much longer period when exposed for sale than when prepared in the usual manner, and furthermore, are especially adapted for packing and shipping.

In preparing poultry according to my method, the fowl may be first dressed in the usual manner. I next remove the intestines by withdrawing them through the anus. This may be done with the fingers or by the use of forceps, which are inserted through the anus so as to grasp the intestines, which are then withdrawn. In order to remove the intestines considerable force must be applied as it is necessary to forcibly separate them from the gizzard.

When the intestines have been removed, I find it desirable to seal the interior of the fowl against the access of air. This may be done in various ways. For example, paper or like material may be inserted through the anus, so as to stuff or fill out the interior of the fowl. Or, if desired, an expansible bladder may be inserted, and inflated in the interior of the fowl, and the opening tied to maintain the bladder in inflated condition.

Besides sealing the interior against air, the stuffing operation has the added advantage of filling out the body of the fowl giving it a plump and pleasing appearance.

I am aware that variations or modifications in the method may be made without departing from the spirit of my invention.

Having thus described my invention, what I claim as new and desire to secure by Letters Patent is:—

1. The method of preparing a fowl for packing or display which consists in removing the intestines through the anus of the fowl without any cutting operation other than the severance of the withdrawn intestines.

2. The method of preparing fowls for packing or display which consists in removing the intestines through the anus of the fowl without any cutting operation other than the severance of the withdrawn intestines, and subsequently sealing the interior of the fowl against the access of air.

3. The method of preparing fowls for packing or display, which consists in removing the intestines through the anus of the fowl without any cutting operation other than the severance of the withdrawn intestines, and subsequently filling the space previously occupied by the intestines with other material.

4. A method of preparing fowls for packing or display which consists in removing the intestines of the fowl without any cutting operation other than the severance of the withdrawn intestines.

5. A fowl prepared for packing or display, having the intestines removed, and the flesh of the fowl uncut except for the severance of the withdrawn intestines.

In testimony whereof I affix my signature.

EUGENE J. NAGY.